US012500717B2

(12) United States Patent
Sahin et al.

(10) Patent No.: US 12,500,717 B2
(45) Date of Patent: Dec. 16, 2025

(54) TRANSMISSION OF CONTROL INFORMATION ASSOCIATED WITH SIDELINK POSITIONING REFERENCE SIGNAL

(71) Applicant: Nokia Technologies Oy, Espoo (FI)

(72) Inventors: Taylan Sahin, Munich (DE); Torsten Wildschek, Gloucester (GB); Diomidis Michalopoulos, Munich (DE); Yong Liu, Shanghai (CN); Mikko Säily, Espoo (FI); Berthold Panzner, Munich (DE); Dileep Kumar, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/928,840

(22) Filed: Oct. 28, 2024

(65) Prior Publication Data

US 2025/0055625 A1 Feb. 13, 2025

Related U.S. Application Data

(63) Continuation of application No. PCT/CN2022/106570, filed on Jul. 19, 2022.

(51) Int. Cl.
*H04W 72/25* (2023.01)
*H04L 5/00* (2006.01)
*H04W 64/00* (2009.01)

(52) U.S. Cl.
CPC ........... *H04L 5/0048* (2013.01); *H04W 64/00* (2013.01); *H04W 72/25* (2023.01)

(58) Field of Classification Search
CPC . H04W 64/00; H04W 72/0453; H04W 72/20; H04W 72/25; H04W 72/51;

(Continued)

(56) References Cited

U.S. PATENT DOCUMENTS 12,095,566 B2 * 9/2024 Hwang ................ H04L 1/1812
2021/0337514 A1 10/2021 Xiang et al.
(Continued)

FOREIGN PATENT DOCUMENTS

CN 113766529 A 12/2021
CN 114651492 A 6/2022
(Continued)

OTHER PUBLICATIONS

"Revised SID on Study on expanded and improved NR positioning", 3GPP TSG RAN Meeting #94e, RP-213588, Agenda Item: 8.6.1, Intel, Dec. 6-17, 2021, 5 pages.

(Continued)

*Primary Examiner* — Joseph Arevalo
(74) *Attorney, Agent, or Firm* — Nokia Technologies Oy

(57) ABSTRACT

Example embodiments of the present disclosure relate to transmission of control information associated with sidelink positioning reference signal. In an example method, a first terminal device in a radio access network comprises at least one processor; and at least one memory including computer program code; the at least one memory and the computer program code configured to, with the at least one processor, cause the first terminal device to: transmit, to a second terminal device in the radio access network, control information associated with a sidelink (SL) positioning reference signal (PRS) during a SL positioning session for positioning of the second terminal device, using a resource for the control information in a Physical Sidelink Feedback Channel (PSFCH) symbol or in at least one symbol dedicated for the control information. In this way, the first terminal device can efficiently transmit control information to the second terminal device with backward compatibility.

15 Claims, 13 Drawing Sheets

(58) Field of Classification Search
CPC .... H04W 76/14; H04W 92/18; H04L 5/0051; H04L 5/0005; H04L 5/0012; H04L 5/0032; H04L 5/0033; H04L 5/0048; H04L 5/0064; H04L 5/0094
USPC ....... 370/329, 330, 503, 252, 315, 311, 331, 370/328, 310, 279
See application file for complete search history.

(56) References Cited

U.S. PATENT DOCUMENTS

| | | | |
|---|---|---|---|
| 2022/0046660 A1 | 2/2022 | Huang et al. | |
| 2022/0065978 A1 | 3/2022 | Manolakos et al. | |
| 2022/0416976 A1* | 12/2022 | Baek | H04W 72/51 |
| 2023/0101824 A1* | 3/2023 | Baek | H04W 4/40 |
| | | | 455/522 |
| 2023/0199804 A1* | 6/2023 | Hwang | H04W 72/25 |
| 2024/0049260 A1* | 2/2024 | Li | H04L 5/0048 |
| 2024/0129901 A1* | 4/2024 | Su | H04W 72/044 |
| 2024/0163902 A1* | 5/2024 | Hwang | H04J 11/0069 |
| 2024/0188099 A1* | 6/2024 | Hwang | H04W 72/0453 |
| 2024/0224302 A1* | 7/2024 | Li | H04L 5/0094 |
| 2024/0340927 A1* | 10/2024 | Liu | H04L 5/0048 |

FOREIGN PATENT DOCUMENTS

| | | |
|---|---|---|
| WO | 2021/029547 A1 | 2/2021 |
| WO | 2021/097598 A1 | 5/2021 |
| WO | 2021/101182 A1 | 5/2021 |
| WO | 2021/112610 A1 | 6/2021 |
| WO | 2021/141468 A1 | 7/2021 |
| WO | 2022/089718 A1 | 5/2022 |
| WO | 2022/120817 A1 | 6/2022 |
| WO | 2022/150040 A1 | 7/2022 |
| WO | 2023/060492 A1 | 4/2023 |
| WO | 2023/131843 A1 | 7/2023 |

OTHER PUBLICATIONS

"3rd Generation Partnership Project; Technical Specification Group Radio Access Network; Overall description of Radio Access Network (RAN) aspects for Vehicle-to-everything (V2X) based on LTE and NR (Release 17)", 3GPP TR 37.985, V17.1.1, Mar. 2022, pp. 1-38.

Garcia et al., "A tutorial on 5G NR V2X communications", IEEE Communications Surveys & Tutorials, vol. 23, No. 3, thirdquarter 2021, pp. 1972-2026.

U.S. Appl. No. 63/292,135, "Transmission of Sidelink Reference Signals", filed Dec. 21, 2021, pp. 1-27.

"Discussion on potential solutions for SL positioning", 3GPP TSG RAN WG1 #109-e, R1-2203980, Agenda Item: 9.5.1.3, OPPO, May 9-20, 2022, 5 pages.

"Discussions on Potential solutions for SL positioning", 3GPP TSG-RAN WG1 Meeting #109-e, R1- 2204253, Agenda Item: 9.5.1.3, Apple Inc, May 9-20, 2022, 9 pages.

"Discussion on potential solutions for SL positioning", 3GPP TSG RAN WG1 #109-e, R1-2203624, Agenda item: 9.5.1.3, ZTE, May 9-20, 2022, pp. 1-11.

Liu et al., "Design aspects on physical layer structure for 5G V2X and related issues", IEEE 93rd Vehicular Technology Conference (VTC2021—Spring), Apr. 25-28, 2021, 5 pages.

International Search Report and Written Opinion received for corresponding Patent Cooperation Treaty Application No. PCT/CN2022/106570, dated Dec. 22, 2022, 9 pages.

"Discussion on physical layer procedures for NR sidelink", 3GPP TSG RAN WG1 Meeting #98, R1-1908906, Agenda item: 7.2.4.5, LG Electronics, Aug. 26-30, 2019, 19 pages.

Office action received for corresponding Taiwanese Patent Application No. 112124951, dated Apr. 16, 2024, 14 pages of office action and 4 pages of translation available.

Office action received for corresponding Vietnam Patent Application No. 1-2024-09847, dated Apr. 9, 2025, 1 page of office action and 1 page of translation available.

Extended European Search Report received for corresponding European Patent Application No. 22951459.1, dated May 19, 2025, 8 pages.

"Moderator Summary #1 for [109-e-R18-Pos-04] Email discussion on potential solutions for SL positioning", 3GPP TSG RAN WG1 #109-e, R1-2205202, Agenda item: 9.5.1.3, Qualcomm, May 9-20, 2022, 114 pages.

Office action received for corresponding Australian Patent Application No. 2022469913, dated Aug. 13, 2025, 3 pages.

"3rd Generation Partnership Project; Technical Specification Group Radio Access Network; NR; Physical layer procedures for control (Release 18)", 3GPP TS 38.213 V18.7.0, Jun. 2025, pp. 1-313.

"3rd Generation Partnership Project; Technical Specification Group Radio Access Network; NG Radio Access Network (NG-RAN); Stage 2 functional specification of User Equipment (UE) positioning in NG-RAN (Release 18)", 3GPP TS 38.305 V18.6.0, Jun. 2025, pp. 1-185.

"3rd Generation Partnership Project; Technical Specification Group Radio Access Network; NR; Physical layer procedures for data (Release 18)", 3GPP TS 38.214 V18.7.0, Jun. 2025, pp. 1-301.

"3rd Generation Partnership Project; Technical Specification Group Radio Access Network; NR; Multiplexing and channel coding (Release 18)", 3GPP TS 38.212 V18.7.0, Jun. 2025, pp. 1-296.

"3rd Generation Partnership Project; Technical Specification Group Radio Access Network; NR; Radio Resource Control (RRC) protocol specification (Release 18)", 3GPP TS 38.331 V18.7.0, Sep. 2025, pp. 1-1719.

Office action received for corresponding Japanese Patent Application No. 2025-502399, dated Oct. 23, 2025, 3 pages of office action and 4 pages of translation available.

* cited by examiner

TRANSMISSION OF CONTROL INFORMATION ASSOCIATED WITH SIDELINK POSITIONING REFERENCE SIGNAL

RELATED APPLICATION

This application is a continuation of PCT Patent Application No. PCT/CN2022/106570, filed Jul. 19, 2022, and entitled "TRANSMISSION OF CONTROL INFORMATION ASSOCIATED WITH SIDELINK POSITIONING REFERENCE SIGNAL", which is incorporated herein by reference in its entirety.

FIELD

Example embodiments of the present disclosure generally relate to the field of telecommunication, and in particular, to a first terminal device, a second terminal device, a network device in a radio access network, methods, apparatuses and a computer readable storage medium for a transmission of control information associated with a sidelink positioning reference signal.

BACKGROUND

In 3GPP Release 18 Study Item, sidelink (SL) positioning is going to be studied to expand and improve New Radio (NR) positioning. One of the goals of the Release 18 Study Item is to reuse the existing SL physical layer design as much as possible. This is to enable backward compatibility to the best extend, and reduce efforts in the standardization. The current SL frame structure, however, has been designed only with SL communications in mind. Positioning signals, on the other hand, have special requirements, most notably in terms of bandwidth and latency. This is to enable accurate and timely measurements with the overall aim of satisfying the diverse Quality of Service (QOS) requirements of sidelink positioning use cases.

For SL positioning, it is needed to define a signal as SL positioning reference signal (SL PRS), and control information associated with SL PRS. Transmissions of the control information associated with SL PRS and SL PRS needs to be accommodated in the SL frame structure with minimum impact on legacy operation, while satisfying the need of positioning.

SUMMARY

In general, example embodiments of the present disclosure provide a solution for transmission of control information associated with sidelink positioning reference signal.

In a first aspect, there is provided a first terminal device in a radio access network. The first terminal device in the radio access network comprises at least one processor; and at least one memory including computer program code; the at least one memory and the computer program code configured to, with the at least one processor, cause the first terminal device to: transmit, to a second terminal device in the radio access network, control information associated with a sidelink (SL) positioning reference signal (PRS) during a SL positioning session for positioning of the second terminal device, using a resource for the control information associated with the SL PRS in a Physical Sidelink Feedback Channel (PSFCH) symbol or in at least one symbol dedicated for the control information associated with the SL PRS.

In a second aspect, there is provided a second terminal device in a radio access network. The second terminal device in the radio access network comprises at least one processor; and at least one memory including computer program code; the at least one memory and the computer program code configured to, with the at least one processor, cause the second terminal device to: receive, from a first terminal device in the radio access network, control information associated with a sidelink (SL) positioning reference signal (PRS) during a SL positioning session for positioning of the second terminal device, using the resource for the control information in a Physical Sidelink Feedback Channel (PSFCH) symbol or in at least one symbols dedicated for the control information associated with the SL PRS.

In a third aspect, there is provided a network device in a radio access network. The network device in the radio access network comprising: at least one processor; and at least one memory including computer program code; the at least one memory and the computer program code configured to, with the at least one processor, cause the network device to: transmit to at least one terminal device in the radio access network, configuration information associated with sidelink (SL) positioning sessions for positioning of at least one terminal device in the radio access network.

In a fourth aspect, there is provided a method performed by a first terminal device in a radio access network. The method comprises: transmitting, at a first terminal device in a radio access network to a second terminal device in the radio access network, control information associated with a sidelink (SL) positioning reference signal (PRS) during a SL positioning session for positioning of the second terminal device, using a resource for the control information associated with the SL PRS in a Physical Sidelink Feedback Channel (PSFCH) symbol or in at least one symbol dedicated for the control information associated with the SL PRS.

In a fifth aspect, there is provided a method performed by a second terminal device in a radio access network. The method comprises: receiving, at a second terminal device in a radio access network, from a first terminal device in the radio access network, control information associated with a sidelink (SL) positioning reference signal (PRS) during a SL positioning session for positioning of the second terminal device, using the resource for the control information associated with the SL PRS in a Physical Sidelink Feedback Channel (PSFCH) symbol or in at least one symbols dedicated for the control information associated with the SL PRS.

In a sixth aspect, there is provided a method performed by a network device in a radio access network. The method comprises: transmitting, at a network device in a radio access network to at least one terminal device in the radio access network, configuration information associated with sidelink (SL) positioning sessions for positioning of at least one terminal device in the radio access network.

In a seventh aspect, there is provided an apparatus. The apparatus comprising: means for transmitting, at a first terminal device in a radio access network to a second terminal device in the radio access network, control information associated with a sidelink (SL) positioning reference signal (PRS) during a SL positioning session for positioning of the second terminal device, using a resource for the control information associated with the SL PRS in a Physical Sidelink Feedback Channel (PSFCH) symbol or in at least one symbol dedicated for the control information.

In an eighth aspect, there is provided an apparatus. The apparatus comprising: means for receiving, at a second terminal device in a radio access network, from a first terminal device in the radio access network, control information associated with a sidelink (SL) positioning reference signal (PRS) during a SL positioning session for positioning of the second terminal device, using the resource for the control information associated with the SL PRS in a Physical Sidelink Feedback Channel (PSFCH) symbol or in at least one symbols dedicated for the control information.

In a ninth aspect, there is provided an apparatus. The apparatus comprising: means for transmitting, at a network device in a radio access network to at least one terminal device in the radio access network, configuration information associated with sidelink (SL) positioning sessions for positioning of at least one terminal device in the radio access network.

In a tenth aspect, there is provided a non-transitory computer readable medium comprising program instructions for causing an apparatus to perform at least the method in the fourth, fifth, and sixth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar elements.

DETAILED DESCRIPTION

Figure 1:
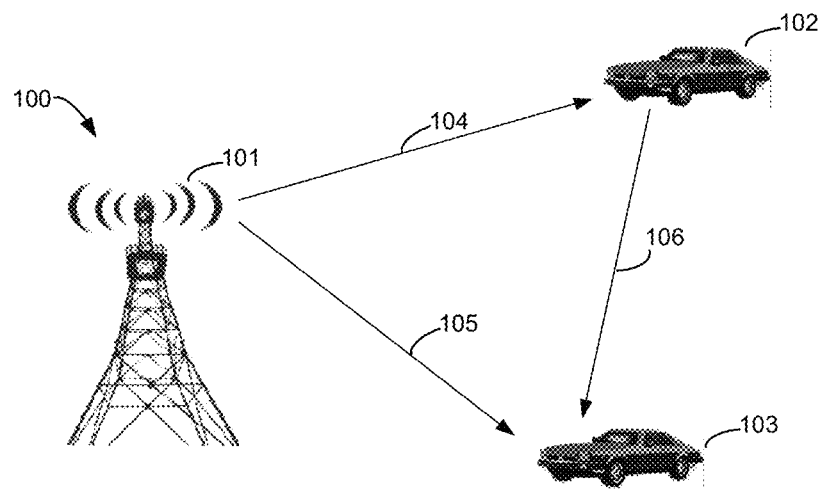
FIG. 1 illustrates an example of a network environment in which some example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(s) that work together to cause an apparatus, such as a mobile phone or server, to perform various functions) and
  (c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. In the following description, the terms "terminal device", "communication device", "terminal" may be used interchangeably.

In 3GPP Release 18 Study Item, Sidelink (SL) positioning, is going to be studied to expand and improve New Radio (NR) positioning. One of the goals of the Rel. 18. Study Item is to reuse the existing SL physical layer design as much as possible. This is to enable backward compatibility to the best extend, and reduce efforts in the standardization. The current SL frame structure, however, has been designed only with SL communications in mind. Positioning signals, on the other hand, have special requirements, most notably in terms of bandwidth and latency. This is to enable accurate and timely measurements with the overall aim of satisfying the diverse Quality of Service (QOS) requirements of sidelink positioning use cases.

In order to realize Radio Access Technology (RAT) dependent positioning techniques, a reference signal needs to be transmitted over the cellular interfaces. In conventional Uplink (UL) or Downlink (DL) based positioning, the following signals have been defined: DL: Positioning Reference Signal (PRS), UL: Sounding Reference Signal (SRS) for positioning.

As used herein, for SL positioning, sidelink positioning reference signal (SL PRS) refers as the reference signal to be transmitted over the SL interface. For SL positioning, it is also needed to define control information associated with SL PRS. Transmissions of the control information associated with SL PRS and SL PRS needs to be accommodated in the SL frame structure with minimum impact on legacy operation, while satisfying the need of positioning.

Example embodiments of the present disclosure provide a scheme to solve the above discussed issues. With this scheme, the control information associated with SL PRS transmission and reception over the SL interface is designed, while reusing the existing specifications for backward compatibility. Principles and some example embodiments of the present disclosure will be described in detail below with reference to the accompanying drawings.

FIG. 1 illustrates an example of a network environment 100 in which some example embodiments of the present disclosure may be implemented. In a radio access network, or the network environment 100, there are a network device 101, a first terminal device 102 and a second terminal device 103. The network device 101 transmits configuration information associated with SL positioning session for positioning to the terminal device 102 and 103 in 104 and 105. The first terminal device 102 transmits the control information associated with the SL PRS to the second terminal device 103 in 106 directly, without via the network device 101. The first terminal device 102 can also transmit the PRS to the second terminal device 103 in 106. The terminal devices 102 and 103 can be vehicles, or other terminal devices in SL positioning session.

Figure 2:
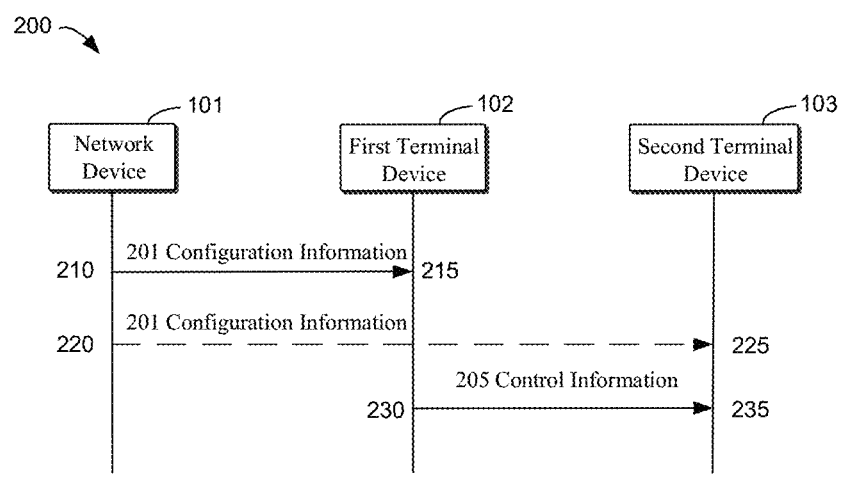
FIG. 2 illustrates an example of a process flow for transmissions of the control information associated with SL PRS.

FIG. 2 illustrates an example of a process flow 200 for transmissions of the control information associated with SL PRS. For the purpose of discussion, the process flow 200 will be described with reference to FIG. 1. It would be appreciated that although the process flow 200 has been described referring to the network environment 100 of FIG. 1, this process flow 200 may be likewise applied to other similar communication scenarios.

In the process flow 200, the network device 101 transmits (210) configuration information 201 associated with SL positioning session to the first terminal device 102. Additionally, the network device 101 transmits (220) the configuration information 201 associated with SL positioning session to the second terminal device 103.

Continuing with reference to FIG. 2, the first terminal device 102 receives (215) the configuration information 201 associated with SL positioning session from the network device 101. Then, The first terminal device 102 transmits (230) to the second terminal device 103, control information 205 associated with a sidelink (SL) positioning reference signal (PRS), during a SL positioning session for positioning of the second terminal device, using a resource for the control information 205 in a Physical Sidelink Feedback Channel (PSFCH) symbol or in at least one symbol dedicated for the control information.

In some example embodiments, the configuration information 201 may comprise: a plurality of slots for SL positioning sessions. This can be used to indicate to the terminal devices, the slots used for the positioning sessions in SL.

Additionally or alternatively, the configuration information 201 may comprise whether the resource for control information 205 is in at least one PSFCH symbol, at least one PSCCH symbol, and at least one symbol dedicated for the control information associated with SL PRS, This can indicate the first terminal device 102 to transmit the control information associated with SL PRS in the symbols above, and indicate the second terminal device 103 to receive the control information 205 in the symbols above.

Additionally or alternatively, the configuration information 201 may comprise whether the resource for the control information 205 and the resource for the SL PRS are in different resource pools. The network device 101 can configure a specific SL resource pool (or pools) for the transmission of SL PRS, e.g., a pool that contains new mini-slots with dedicated symbols for SL PRS transmission. The control information 205 associated with SL PRS transmissions, in this case, could be transmitted in other pools, e.g., that are fully compatible with legacy UEs as well. The terminal device 102 can use one of the SL resource pools to reserve and indicate the SL PRS resources in another pool, via different options for transmitting the control information associated with SL PRS and the SL PRS. In turn, the terminal device 102 can transmit SL PRS in the other pool via different options for transmitting SL PRS.

Additionally or alternatively, the configuration information 201 may comprise whether the resource for SL PRS is in at least one DRMS symbol or the at least one symbol dedicated for the SL PRS. For example, the first terminal device 102 may use the dedicated symbol for SL PRS transmission that the at least one DMRS symbol cannot provide sufficient resource for the positioning quality of service requirement.

This way, the network device 101 can indicate the resource for transmitting the control information 205 and the SL PRS to the terminal devices clearly, avoiding resource waste and collision in signal transmission.

In some example embodiments, the configuration information 201 from the network device 101 can be comprised in a broadcast downlink (DL) radio resource control (RRC) system information block (SIB) message. The configuration information 201 can comprise various contents. For example, the configuration information may include configured slots for SL positioning session, such as slot containing at least one symbol dedicated for positioning control information repeating every 8 slots. This way, the configuration information can be stably transmitted to all the necessary terminal devices in the SL positioning sessions.

In some example embodiments, the control information 205 associated with SL PRS can comprise various contents. For example, the control information 205 can include slot type or format where SL PRS will be transmitted. The slot can be legacy slot with DMRS to be used for transmitting "SL PRS", with different DMRS configurations. The slot can also be a new mini-slot containing at least one dedicated symbol for SL PRS.

As another example, the control information 205 associated with SL PRS may include resource pool identifier (ID) where SL PRS will be transmitted. As another example, the control information 205 associated with SL PRS can include offset indicating the number of slots after which the SL PRS will be transmitted. As another example, the control information 205 may include other control information associated with SL PRS, such as resource allocation, or symbols and sub-channels in the slot, periodicity, comb structure, etc. This way, the control information 205 associated with SL PRS can control the SL PRS more flexibly. As a further example, the control information associated with SL PRS may include any combination of one or more of the aforementioned contents.

Continuing with reference to FIG. 2, the second terminal device 103 receives (225) the configuration information 201 associated with SL positioning session from the network device 101. Then, the second terminal device 103 receives (235), from the first terminal device 102 in the radio access network, control information 205 associated with a sidelink (SL) positioning reference signal (PRS) during a SL positioning session for positioning of the second terminal device, using the resource for the control information associated with SL PRS in a Physical Sidelink Feedback Channel (PSFCH) symbol or in at least one symbol dedicated for the control information associated with SL PRS.

This way, the second terminal device 103 can get resource allocation for the control information associated with SL PRS from the network device 101, then get detailed information for SL PRS from the control information associated with SL PRS. It can avoid resource waste and collision in signal transmission associated with SL PRS.

Figure 3A:
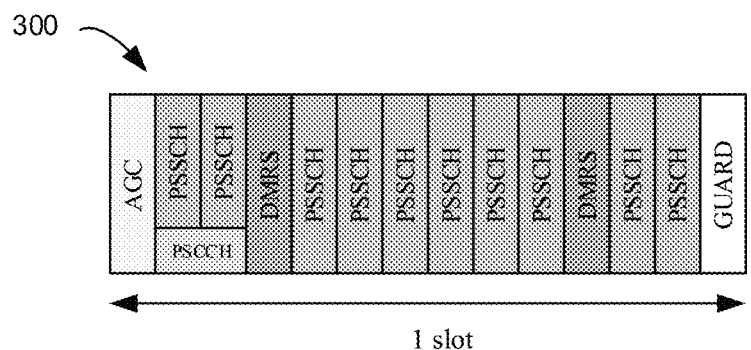
FIG. 3A illustrates an example of a sidelink frame format in accordance with some example embodiments of the present disclosure.
Figure 3B:
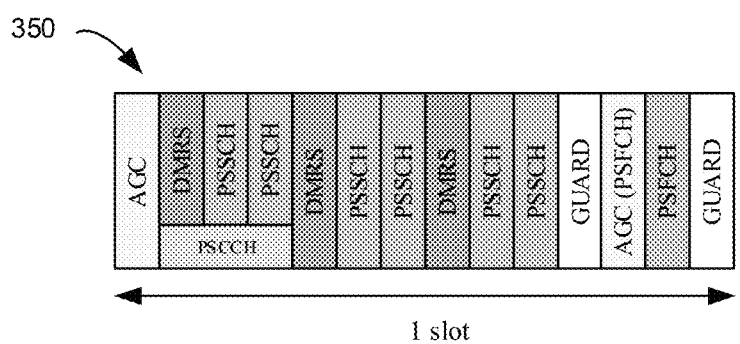
FIG. 3B illustrates another example of a sidelink frame format in accordance with some example embodiments of the present disclosure.

FIG. 3A and FIG. 3B illustrate examples of a sidelink frame format in accordance with some example embodiments of the present disclosure. The New Radio (NR) sidelink currently uses the following physical channels and signals, among others, for SL communications purposes. Physical Sidelink Control Channel (PSCCH) carries control information associated with SL PRS in the sidelink, also known as sidelink control information (SCI). Physical Sidelink Shared Channel (PSSCH) carries data payload in the sidelink and additional control information. Physical Sidelink Feedback Channel (PSFCH) carries feedback related to the successful or failed reception of a sidelink transmission, as well as inter-UE coordination information. Demodulation reference signal (DMRS) is used by a receiver for decoding the associated sidelink physical channel, such as PSCCH and PSSCH.

The resources in which PSSCH is transmitted can be scheduled or configured by the network device 101 such as gNB in resource allocation mode 1, or determined through a sensing procedure conducted autonomously by the first terminal device 102, or transmitting UE in resource allocation mode 2. DMRS associated with PSSCH can be transmitted in 2, 3, or 4 sidelink symbols distributed through a sidelink slot.

According to example embodiments of the present disclosure, there are 2 symbols of PSCCH, and 2 symbols of PSSCH-DRMS in a slot, while without PSFCH in FIG. 3A. In addition to the above-mentioned physical channels and signals, the automatic gain control (AGC) symbol is used to adjust the received signal power, and a guard symbol is for timing adjustments and to allow terminal devices switching between transmission and reception across slots. There are 3 symbols of PSCCH, 3 symbols of PSSCH-DRMS, and one symbol of PSFCH in a slot in FIG. 3B.

Figure 4:
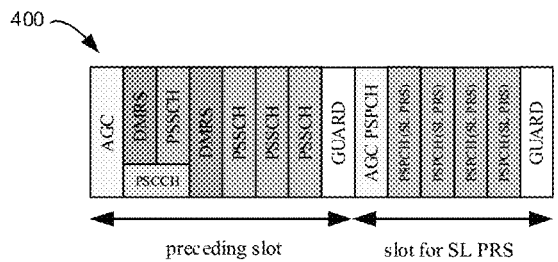
FIG. 4 illustrates an example of a slot structure for SL PRS in accordance with some example embodiments of the present disclosure.

FIG. 4 illustrates an example of a slot structure for SL PRS in accordance with some example embodiments of the present disclosure. In current implementation, there are dedicated symbols for SL PRS transmission in a SL slot, as in FIG. 4. The associated control information for SL PRS, and "meta-data" related to positioning (e.g., device known position, measurement results, etc.) are transmitted using PSCCH/PSSCH in a preceding slot.

Figure 5A:
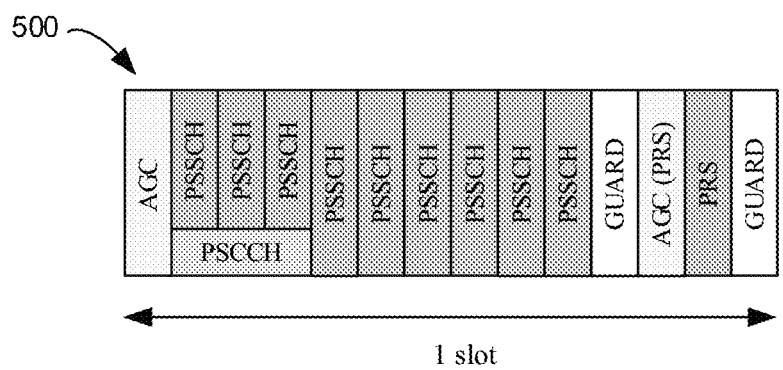
FIG. 5A illustrates another example of a slot structure for SL PRS in accordance with some example embodiments of the present disclosure.

FIG. 5A illustrates another example of a slot structure for SL PRS in accordance with some example embodiments of the present disclosure. In this implementation, the resource allocation for SL PRS comprises a set of dedicated symbols for SL PRS transmission in a SL slot. Last symbols in the slot are assigned for SL PRS. The symbol before that carrying PRS is used as an AGC symbol.

Figure 5B:
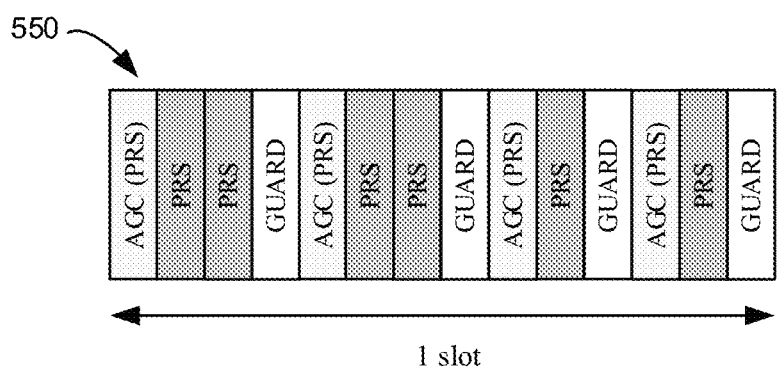
FIG. 5B illustrates a further example of a slot structure for SL PRS in accordance with some example embodiments of the present disclosure.

FIG. 5B illustrates a further example of a slot structure for SL PRS in accordance with some example embodiments of the present disclosure. In this implementation, the resource allocation for SL PRS comprises a set of dedicated symbols for SL PRS transmission in a SL slot. In a slot, multiple set of PRS symbols are configured for SL PRS. In each set of PRS symbols, the first symbol is used as AGC symbol. A guard symbol is allocated between two adjacent sets of PRS symbols.

Figure 6:
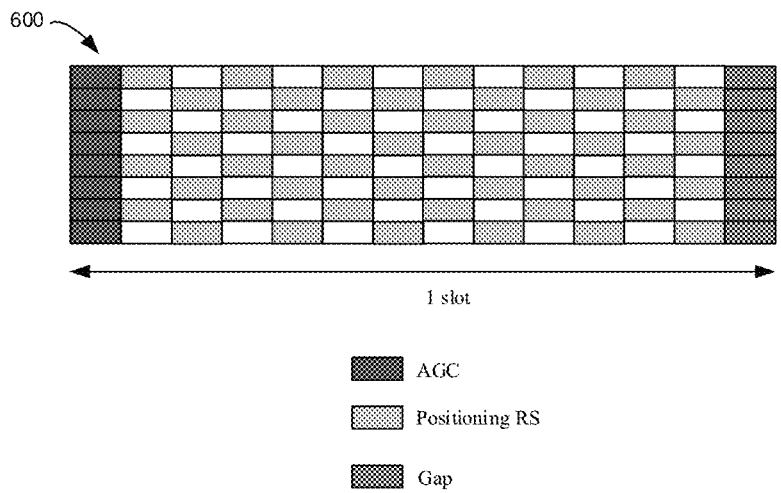
FIG. 6 illustrates a still further example of a slot structure for SL PRS in accordance with some example embodiments of the present disclosure.

FIG. 6 illustrates a still further example of a slot structure for SL PRS in accordance with some example embodiments of the present disclosure. In this implementation, SL PRS is configured in an independent new SL positioning slot.

Figure 7:
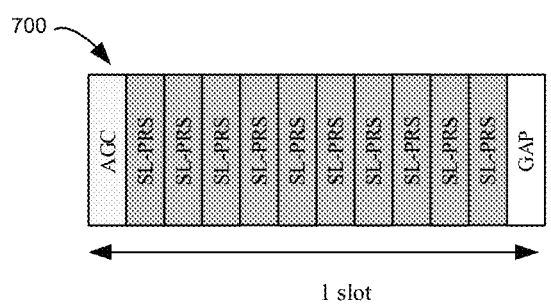
FIG. 7 illustrates a yet another example of a slot structure for SL PRS in accordance with some example embodiments of the present disclosure.

FIG. 7 illustrates a yet another example of a slot structure for SL PRS in accordance with some example embodiments of the present disclosure. In this implementation, there is also a single dedicated slot for SL PRS.

FIGS. 4-7 illustrate several schemes regarding the SL slot structure that dedicated symbols are used for transmitting SL PRS. Based on the existing implementations in prior art, it can be concluded that there are many schemes regarding the SL slot structure or specific SL resources for transmitting SL PRS. However, there is no mention in prior art to efficiently incorporate the transmission of control information associated with SL PRS into the frame structure.

Figure 8:
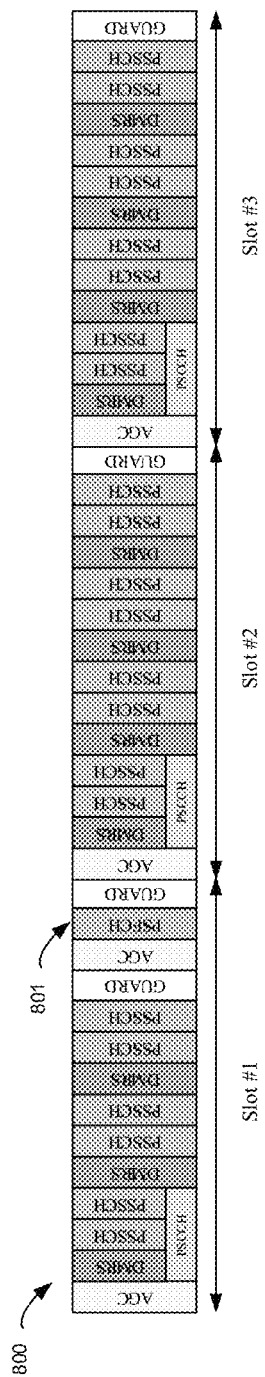
FIG. 8 illustrates an example of transmission of control information associated with SL PRS in accordance with some example embodiments of the present disclosure.
Figure 9:
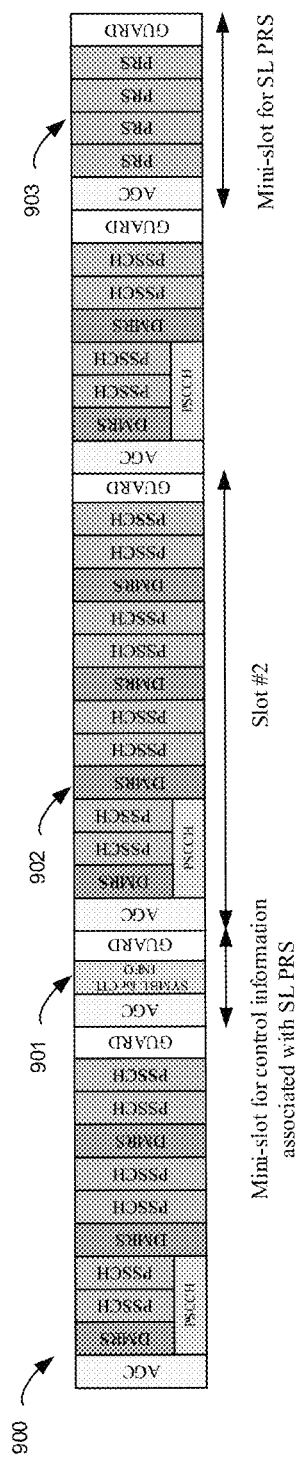
FIG. 9 illustrates another example of transmission of control information associated with SL PRS and SL PRS in accordance with some example embodiments of the present disclosure.
Figure 10:
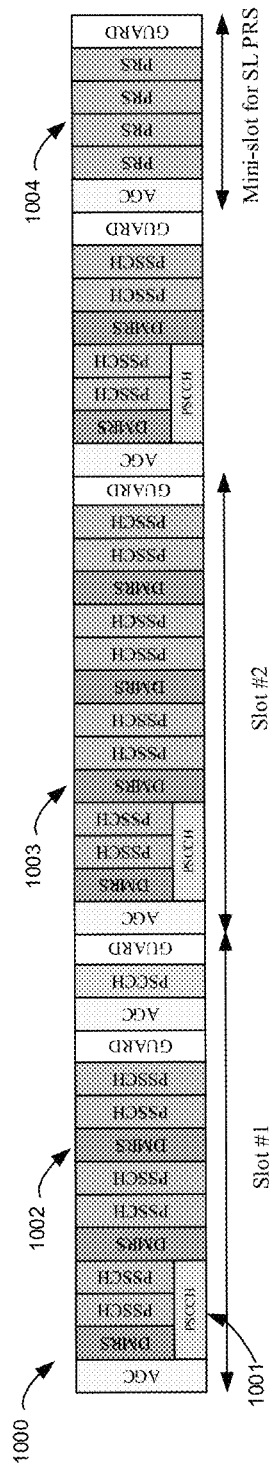
FIG. 10 illustrates a further example of transmission of control information associated with SL PRS and SL PRS in accordance with some example embodiments of the present disclosure.

FIGS. 8, 9, and 10 illustrate examples of transmission of control information associated with SL PRS in accordance with some example embodiments of the present disclosure. According to example embodiments of the present disclosure, FIGS. 8, 9, and 10 illustrate symbol allocation for control information associated with SL PRS and SL PRS.

According to example embodiments of the present disclosure, the first terminal device 102 transmits the control information 205 associated with SL PRS to the second terminal device 103 during a SL positioning session, using a resource in a PSFCH symbol 801. The resource can be at least one physical resource block (PRB) in the PSFCH symbol. This proposal has no impact on the current SL frame structure as in FIG. 3B. The control information 205 associated with SL PRS can utilize unused resources in the PSFCH symbol within a slot configured for this feature. According to example embodiments of the present disclosure, there is a resource pool with 100 PRBs with 10 PRBs per sub-channel in PSFCH. 20 PRBs may be allocated to traditional PSFCH, and the remaining 80 PRBs can be utilized for transmitting the control information 205 associated with SL PRS. This way, the control information 205 associated with SL PRS has the least specification impact, and enables backward compatibility. This is option 1 for transmitting the control information 205.

According to example embodiments of the present disclosure, a new mini-slot may contain a configurable number (e.g., between 1 and 4) of symbols to transmit control information 205 associated with SL PRS dedicatedly. This avoids waste of resources at the remaining part of the slot in case the UE only wants to transmit SL PRS and no other associated data. The rest of the slot can be instead used by SL transmissions of other terminal devices. While this option requires modifications to the SL slot structure, the proposed mini-slot can be placed such as at the end of the slot to enable backward compatibility. This way, legacy terminal devices still can decode the legacy PSCCH in the beginning of the slot, and sense and decode transmissions from other terminal devices.

According to example embodiments of the present disclosure, the first terminal device 102 can transmit control information 205 associated with SL PRS using the new mini-slot, which consists of at least one symbol dedicated for the control information in 901 associated with SL PRS. This is especially efficient when the first terminal device 102 has no other SL data to transmit; hence the rest of the slot is saved for SL transmissions of other terminal devices. By placing the proposed mini-slot consisting of at least one symbol for the control information associated with SL PRS, at the end of the legacy slot structure, it also enables legacy terminal devices to still sense or decode or utilize the first part of the slot. This way, it avoids waste of resources at the remaining part of the slot, and the rest of the slot can be instead used by SL transmissions of other terminal devices, thus ensures backward compatibility. This is option 2 for transmitting the control information 205.

According to example embodiments of the present disclosure, the first terminal device 102 can transmit control information 205 associated with SL PRS using dedicated symbols. Those skilled in the art can understand the mini-slot consist of at least one symbol dedicated for the control information associated with SL PRS can also be placed in other part of the legacy slot structure, such as in the middle of the legacy slot structure, and reserve the following symbol for future usage.

According to example embodiments of the present disclosure, the first terminal device 102 transmits the control information 205 associated with SL PRS using legacy PSCCH in 1001, just as in the case of SL data transmissions. This implementation also does not incur any SL frame structure change. In this case, if the first terminal device 102 has other positioning-related data to transmit together with the control information 205 associated with SL PRS, such as Real Time Trace (RTT) measurements, the positioning-related data can be transmitted in a latency efficient manner by using the PSSCH symbols in the remaining part of the slot. This way, it can keep backward compatibility in a latency efficient manner. This is option 3 for transmitting the control information 205.

According to example embodiments of the present disclosure, the first terminal device 102 can use the DMRS symbols in legacy slots for SL PRS. This can be backward compatible, without requiring any changes to the SL frame structure. However, depending on the SL PRS parameters, DMRS might not be satisfactory to meet the needs for required positioning QoS. In FIG. 10, using the DMRS symbol 1002 for SL PRS transmission in the same slot, where associated control information 205 is sent using legacy PSCCH 1001. This scheme can further improve the positioning latency.

On the other hand, DMRS symbol 902 or 1003 for SL PRS can be in further slot after the slot for the control information 205 associated with SL PRS, this can enable preparation time for receiving the SL PRS at the terminal device 1003, after receiving the control information 205 associated with SL PRS. This way, it is useful for terminals with less capability, such as Internet of Things (IoT) terminals. This is option 1 for transmitting SL PRS.

According to example embodiments of the present disclosure, the first terminal device 102 uses a new type of mini-slot, which contains at least one dedicate symbol 903, 1004 for SL PRS transmission, occupying a part of or completely the slot. The number of at least one symbol in the mini-slot can be configured by the network device 101, such as depending on positioning needs. This implementation may require changes to the SL frame structure. This is option 2 for transmitting SL PRS.

According to example embodiments of the present disclosure, the first terminal device 102 can determine whether to transmit SL PRS in at least one DMRS symbol or at least one dedicated symbol dynamically. For example, the first terminal device 102 may use the dedicated symbol for SL PRS transmission that the at least one DMRS symbol cannot provide sufficient positioning resource for the requirement.

The decision should be done at an anchor terminal device, or at the first terminal device 102 in FIG. 1 and FIG. 2, which can assess the need for dedicated resources. Such assessment should be based on at least one of the following factors. The first factor may be the number of terminal devices in the radio access network 100 that are going to measure the SL PRS in the SL positioning session. The second factor can be the criticality of the positioning session in the radio access network 100 as reflected in the positioning QoS. The third factor may be the resource availability at the anchor terminal device. For example, whether such dedicated symbols or resources are not used or going to be used for SL communication purposes. This way, decision conflict in several terminal devices can be avoided, and can save the transmission resource in SL.

According to example embodiments of the present disclosure, the control information associated with SL PRS and the SL PRS may be scheduled in a same resource, or in different resources. The resource can be resource pool. For example, the control information 205 associated with the SL PRS can be transmitted in one resource pool, while the associated SL PRS transmission can take place in another resource pool. This option is again designed to ensure backward compatibility, where the control information 205 associated with SL PRS can be accommodated within the existing SL slot structure as proposed above, and a different resource pool can be configured for the new Rel-18 UEs, which can transmit or receive SL PRS for SL positioning.

The network device 101 can configure a specific SL resource pool (or pools) for the transmission of SL PRS, e.g., a resource pool that contains new mini-slots with dedicated symbols for SL PRS transmission. The control information 205 associated with SL PRS transmissions, in this case, could be transmitted in other resource pools, e.g., that are fully compatible with legacy terminal devices as well.

Terminal devices can use one of the SL resource pools to reserve and indicate the SL PRS resources in another pool, such as via Control Options 1, 2, or 3. In turn, they transmit SL PRS in the other pool via SL PRS Options 1 or 2.

Figure 11:
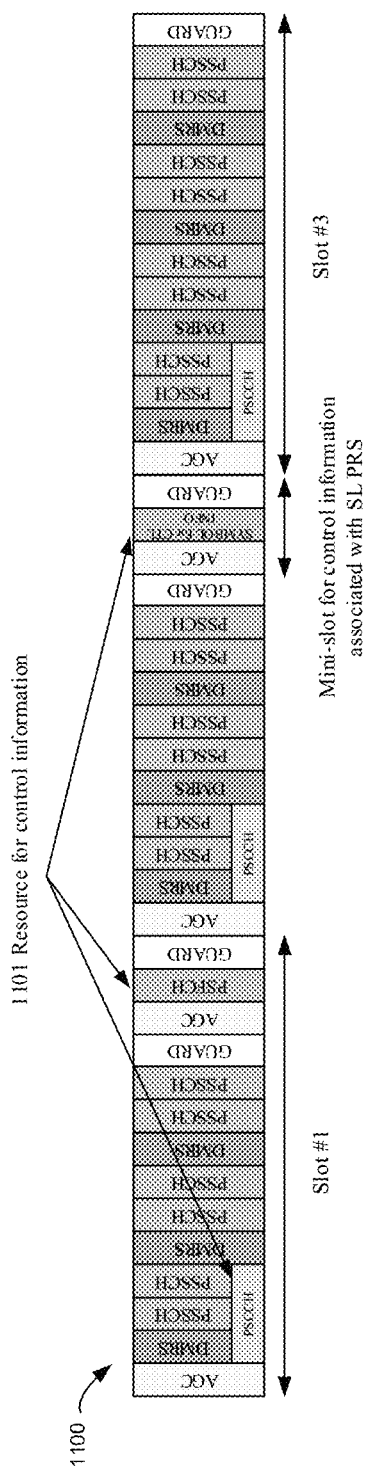
FIG. 11 illustrates a still further example of transmission of control information associated with SL PRS and SL PRS in accordance with some example embodiments of the present disclosure.
Figure 12:
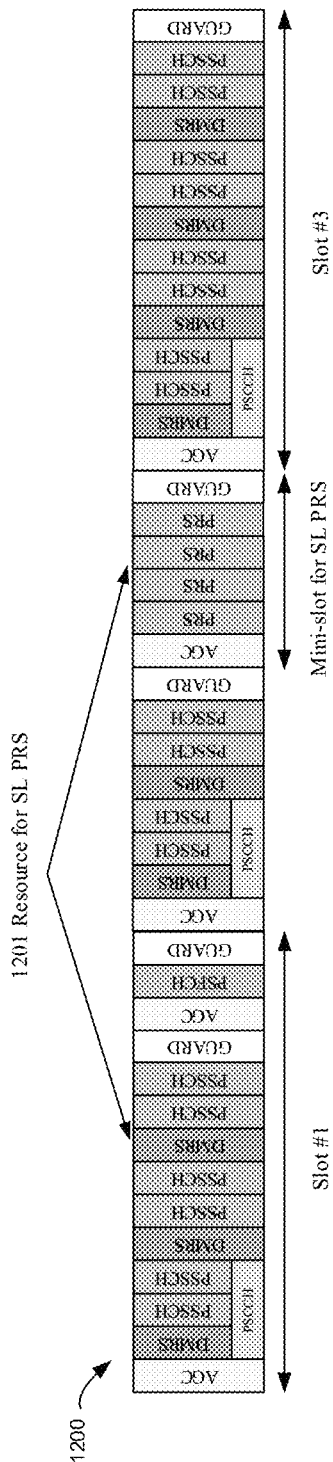
FIG. 12 illustrates a yet another example of transmission of control information associated with SL PRS and SL PRS in accordance with some example embodiments of the present disclosure.

FIG. 11 and FIG. 12 illustrate a still further example of transmission of control information associated with SL PRS and SL PRS in accordance with some example embodiments of the present disclosure. According to example embodiments of the present disclosure, the network device 101 can configure a resource 1101 for control information 205 associated with SL PRS. The resource for the control information 205 associated with SL PRS can be in PSFCH, PSCCH or at least one symbol dedicated for the control information associated with SL PRS. A resource 1201 for SL PRS can be in DMRS or contains a new mini-slot with at least one dedicated symbol. As illustrated in FIG. 11 and FIG. 12, resource 1101 and resource 1201 can be in different resource pool. This way, the resource allocation of the control information associated with SL PRS and the SL PRS can be more flexible.

According to example embodiments of the present disclosure, resource 1101 and resource 1201 can also be in a same resource pool. This way, more accurate position measurement can be achieved in high speed movement of the terminal devices. According to example embodiments of the present disclosure, the disclosure proposes novel control information among SL terminal devices as well as between the network device such as gNB or Location Management Function (LMF) in the core network and the terminal device, in order to utilize the new SL frame structures.

In some example embodiments, the control information 205 associated with SL PRS can comprise various contents. For example, the control information 205 associated with SL PRS can include slot type or format where SL PRS will be transmitted. The slot can be legacy slot with DMRS to be used for transmitting "SL PRS", with different DMRS configurations. The slot can also be a new mini-slot containing at least one dedicated symbol for SL PRS.

As another example, the control information 205 associated with SL PRS may include resource pool identifier (ID) where SL PRS will be transmitted. As another example, the control information 205 associated with SL PRS can include offset indicating the number of slots after which the SL PRS will be transmitted. As another example, the control information 205 associated with SL PRS may include other control info associated with SL PRS, such as resource allocation, or symbols and sub-channels in the slot, periodicity, comb structure, etc. This way, the control information 205 associated with SL PRS can control the SL PRS more flexibly. As a further example, the control information 205 associated with SL PRS may include any combination of one or more of the aforementioned contents.

In some example embodiments, the configuration information from the network device 101 can be comprised in a broadcast downlink (DL) radio resource control (RRC) system information block (SIB) message. The configuration information can comprise various contents. For example, the configuration information 201 may include configured slots for SL positioning session, such as new mini-slot for positioning control information repeating every 8 slots.

As another example, the configuration information 201 can indicate whether terminal devices can use at least one PSFCH symbol, at least one PSCCH symbol, and at least one dedicated symbol for transmitting control information associated with SL PRS. As another example, the configuration information 201 may indicate whether the terminal devices can schedule the control information associated with SL PRS and the SL PRS across different SL resource pools. As another example, the configuration information 201 can indicate whether the terminal devices can use at least one DMRS symbol or at least one dedicated symbol to transmit SL PRS. This way, the network device can configure the resource for SL positioning for all the terminal devices more efficiently, and avoid resource waste or decision conflict among different terminal devices. As a further example, the configuration information may include any combination of one or more of the aforementioned contents.

Figure 13:
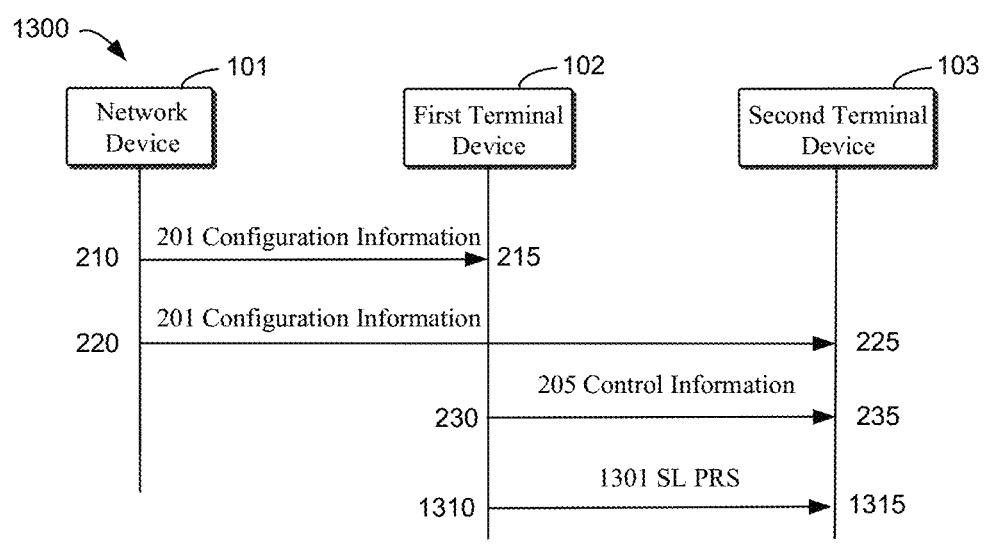
FIG. 13 illustrates an example of a process flow for transmission of control information associated with SL PRS in accordance with some example embodiments of the present disclosure.

FIG. 13 illustrates an example of a process flow 1300 for transmission of control information associated with SL PRS in accordance with some example embodiments of the present disclosure.

In the process flow 1300, the network device 101 transmits (210) configuration information 201 associated with SL positioning session to the first terminal device 102. Additionally, the network device 101 transmits (220) the configuration information associated 201 with SL positioning session to the second terminal device 103.

Continuing with reference to FIG. 13, the first terminal device 102 receives (215) the configuration information 201 associated with SL positioning session from the network device 101. Then, The first terminal device 102 transmits (230) to the second terminal device 103, control information 205 associated with a sidelink (SL) positioning reference signal (PRS), during a SL positioning session for positioning of the second terminal device, using a resource for the control information in a Physical Sidelink Feedback Channel (PSFCH) symbol or in at least one symbol dedicated for the control information.

In some example embodiments, the configuration information may comprise a plurality of slots for SL positioning sessions. This can be used to indicate to the terminal devices, the slots used for the positioning sessions in SL.

Additionally or alternatively, the configuration information 201 may comprise whether the resource for control information 205 associated with SL PRS is in at least one PSFCH symbol, at least one PSCCH symbol, and at least one symbol dedicated for the control information associated with SL PRS, This can indicate the first terminal device 102 to transmit the control information 205 associated with SL PRS in the symbols above, and indicate the second terminal device 103 to receive the control information 205 associated with SL PRS in the symbols above.

Additionally or alternatively, the configuration information 201 may comprise whether the resource for the control information associated with SL PRS and the resource for the SL PRS are in different resource pools. The network device 101 can configure a specific SL resource pool (or pools) for the transmission of SL PRS, e.g., a resource pool that contains new mini-slots with dedicated symbols for SL PRS transmission. The control information 205 associated with SL PRS transmissions, in this case, could be transmitted in other pools, e.g., that are fully compatible with legacy terminal devices as well. The terminal device 102 can use one of the SL resource pools to reserve and indicate the SL PRS resources in another pool, via different control options. In turn, the terminal device 102 can transmit SL PRS in the other pool via different SL PRS options.

Additionally or alternatively, the configuration information 201 may comprise whether the resource for SL PRS is in at least one DRMS symbol or the at least one symbol dedicated for the SL PRS. For example, the first terminal device 102 may use the dedicated symbol for SL PRS transmission that the at least one DMRS symbol cannot provide sufficient positioning resource for the requirement.

This way, the network device 101 can indicate the resource for the control information 205 associated with SL PRS and the SL PRS to the terminal devices clearly, avoiding resource waste and collision in signal transmission.

In some example embodiments, the configuration information 201 from the network device 101 can be comprised in a broadcast downlink (DL) radio resource control (RRC) system information block (SIB) message. The configuration information 201 can comprise various contents. For example, the configuration information 201 may include configured slots for SL positioning session, such as new mini-slot for positioning control information repeating every 8 slots. This way, the configuration information can be stably transmitted to all the necessary terminal devices in the SL positioning sessions.

In some example embodiments, the control information 205 associated with SL PRS can comprise various contents. For example, the control information 205 associated with SL PRS can include slot type or format where SL PRS will be transmitted. The slot can be legacy slot with DMRS to be used for transmitting "SL PRS", with different DMRS configurations. The slot can also be a new mini-slot containing at least one dedicated symbol for SL PRS.

As another example, the control information 205 associated with SL PRS may include resource pool identifier (ID) where SL PRS will be transmitted. As another example, the control information 205 associated with SL PRS can include offset indicating the number of slots after which the SL PRS will be transmitted. As another example, the control information 205 associated with SL PRS may include other control information associated with SL PRS, such as resource allocation, or symbols and sub-channels in the slot, periodicity, comb structure, etc. This way, the control information 205 associated with SL PRS can control the SL PRS more flexibly. As a further example, the control information 205 associated with SL PRS may include any combination of one or more of the aforementioned contents.

The first terminal device 102 transmits (1310) SL PRS 1301 to the second terminal device 103, according to the control information 205.

Continuing with reference to FIG. 13, the second terminal device 103 receives (225) the configuration information 201 associated with SL positioning session from the network device 101. Then, the second terminal device 103 receive (235), from the first terminal device 102 in the radio access network, control information 205 associated with a sidelink (SL) positioning reference signal (PRS) during a SL positioning session for positioning of the second terminal device, using the resource for the control information 205 associated with SL PRS in a Physical Sidelink Feedback Channel (PSFCH) symbol or in at least one symbols dedicated for the control information associated with SL PRS.

This way, the second terminal device 103 can get resource allocation for the control information 205 associated with SL PRS from the network device 101, then get detailed information for SL PRS from the control information associated with SL PRS. It can avoid resource waste and collision in signal transmission.

The second terminal device 103 receives (1315) SL PRS 1301 from the first terminal device 102, according to the control information 205.

Figure 14:
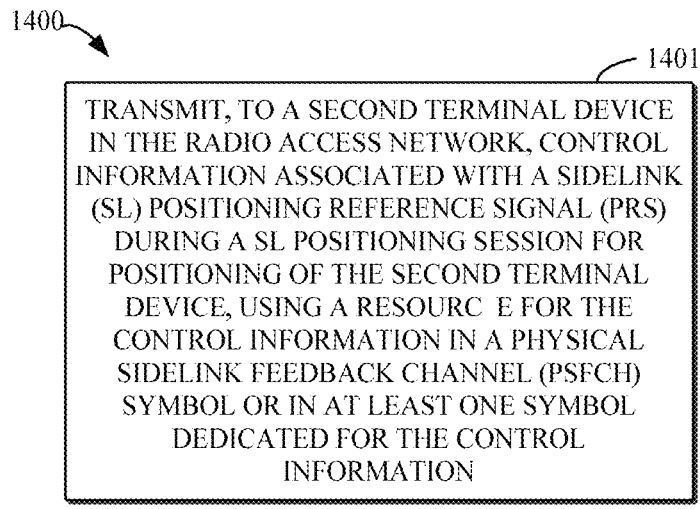
FIG. 14 illustrates an example of a method implemented at a first terminal device in accordance with some example embodiments of the present disclosure.

FIG. 14 illustrates an example of a method 1400 implemented at the first terminal device 102 in accordance with some example embodiments of the present disclosure. At block 1401, the first terminal device transmits, to a second terminal device in the radio access network, control information associated with a sidelink (SL) positioning reference signal (PRS) during a SL positioning session for positioning of the second terminal device, using a resource for the control information associated with the SL PRS in a Physical Sidelink Feedback Channel (PSFCH) symbol or in at least one symbol dedicated for the control information.

In some embodiments, the control information associated with the SL PRS indicates at least one of: a resource for the SL PRS, the resource for the SL PRS being comprised in at least one of: at least one Demodulation Reference Signal (DMRS) symbol or at least one symbol dedicated for the SL PRS, an identifier of a resource pool comprising the resource for the SL PRS, and an offset indicating the number of slots after which the SL PRS is to be transmitted.

In some embodiments, the first terminal device 102 is further caused to: receive, from a network device in the radio access network, configuration information associated with SL positioning sessions for positioning of at least one terminal device in the radio access network; and determine the resource for the control information associated with the SL PRS and the resource for the SL PRS based on the configuration information.

In some embodiments, the first terminal device is further caused to: transmit, to the second terminal device, the control information associated with the SL PRS, using the resource for the control information associated with the SL PRS in at least one Physical Sidelink Control Channel (PSCCH) symbol. In some embodiments, the first terminal device is an anchor terminal device, the first terminal device is further caused to determine the resource for the SL PRS based on at least one of: a number of terminal devices in the radio access network in SL positioning sessions, criticality of the SL positioning session indicated in a positioning quality of service (QOS), and resource availability at the anchor terminal device.

In some embodiments, the resource for the control information associated with the SL PRS and the resource the SL PRS are comprised in a resource pool. In some embodiments, the resource for the control information associated with the SL PRS and the resource for the SL PRS are comprised in different resource pools. The control information is comprised in a sidelink control information (SCI).

In some embodiments, the configuration information indicates at least one of: a plurality of slots for SL positioning sessions, whether the resource for control information associated with the SL PRS is in at least one PSFCH symbol, at least one PSCCH symbol, and at least one symbol dedicated for the control information associated with the SL PRS, whether the resource for the control information associated with the SL PRS and the resource for the SL PRS are in different resource pools, and whether the resource for SL PRS is in at least one DRMS symbol or the at least one symbol dedicated for the SL PRS. In some embodiments, the configuration information is comprised in a broadcast downlink (DL) radio resource control (RRC) system information block (SIB) message.

Figure 15:
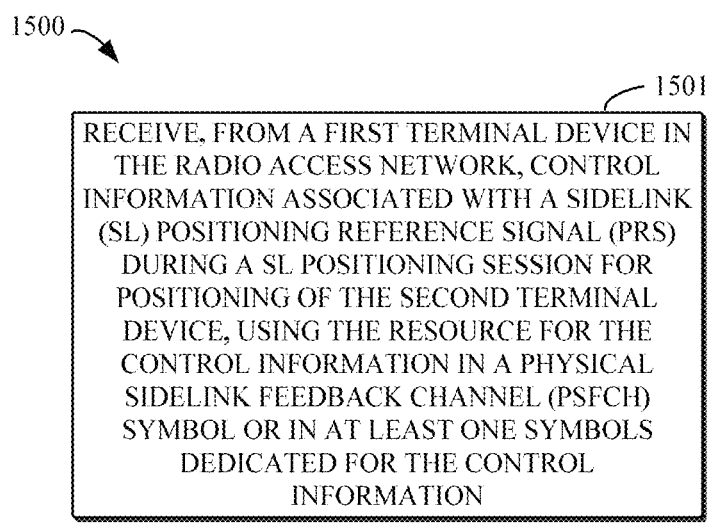
FIG. 15 illustrates an example of a method implemented at a second terminal device in accordance with some example embodiments of the present disclosure.

FIG. 15 illustrates an example of a method 1500 implemented at the second terminal device 103 in accordance with some example embodiments of the present disclosure. At block 1501, the second terminal device receives, from a first terminal device in the radio access network, control information associated with a sidelink (SL) positioning reference signal (PRS) during a SL positioning session for positioning of the second terminal device, using the resource for the control information associated with the SL PRS in a Physical Sidelink Feedback Channel (PSFCH) symbol or in at least one symbols dedicated for the control information.

In some embodiments, the control information associated with the SL PRS indicates at least one of: a resource for the SL PRS, the resource for the SL PRS being comprised in at least one of: at least one Demodulation Reference Signal (DMRS) symbol or at least one symbol dedicated for the SL PRS, an identifier of a resource pool comprising the resource for the SL PRS, and an offset indicating the number of slots after which the SL PRS is to be transmitted. In some embodiments, the second terminal device is further caused to: receive, from a network device in a radio access network, configuration information associated with SL positioning sessions for positioning of at least one terminal device in the radio access network.

In some embodiments, the second terminal device is further caused to: receive, from the first terminal device, the control information associated with the SL PRS using the resource for the control information associated with the SL PRS in at least one Physical Sidelink Control Channel (PSCCH) symbol. In some embodiments, the resource for the control information associated with the SL PRS and the resource for the SL PRS are comprised in a resource pool. In some embodiments, the resource for the control information associated with the SL PRS and the resource for the SL PRS are comprised in different resource pools.

In some embodiments, the control information associated with the SL PRS is comprised in a sidelink control information (SCI). In some embodiments, the configuration information indicates at least one of: a plurality of slots associated with SL positioning sessions, whether the resource for control information associated with the SL PRS is in at least one PSFCH symbol, at least one PSCCH symbol, and at least one symbol dedicated for the control information associated with the SL PRS, and whether the resource for the control information associated with the SL PRS and the resource for the SL PRS are in different resource pools. In some embodiments, the configuration information is comprised in a broadcast downlink (DL) radio resource control (RRC) system information block (SIB) message.

Figure 16:
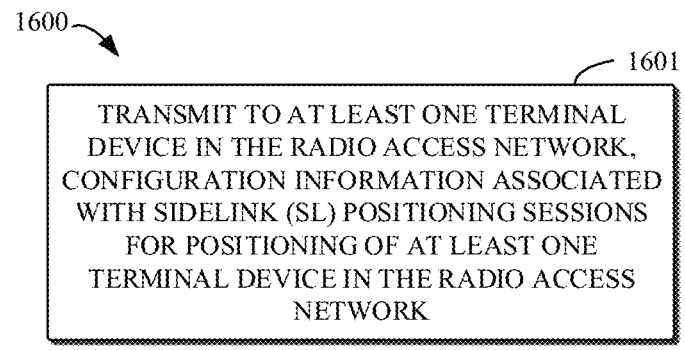
FIG. 16 illustrates an example of a method implemented at a network device in accordance with some example embodiments of the present disclosure.

FIG. 16 illustrates an example of a method 1600 implemented at the network device 101 in accordance with some example embodiments of the present disclosure. At block 1601, the network device transmits to at least one terminal device in the radio access network, configuration information associated with sidelink (SL) positioning sessions for positioning of at least one terminal device in the radio access network.

In some embodiments, the configuration information indicates at least one of: a plurality of slots for SL positioning sessions, whether resource for control information is in at least one of: a Physical Sidelink Feedback Channel (PSFCH) symbol, at least one Physical Sidelink Control Channel (PSCCH) symbol, and at least one symbol dedicated for the control information, wherein the control information is associated with a SL positioning reference signal (SL PRS) during sidelink positioning sessions for positioning of the at least one terminal, whether the resource for the control information associated with the SL PRS and a resource for the SL PRS are in different resource pools, and whether the resource for the SL PRS is in at least one Demodulation Reference Signal (DMRS) symbol or at least one symbol dedicated for the SL PRS.

In some embodiments, the configuration information is comprised in a broadcast downlink (DL) radio resource control (RRC) system information block (SIB) message.

In some embodiments, an apparatus capable of performing the method 1400 (for example, the first terminal device 102) may comprise means for performing the respective steps of the method 1400. The means may be implemented in any suitable form. For example, the means may be implemented in a circuitry or software module.

In some embodiments, an apparatus capable of performing the method 1400 (for example, the first terminal device 102 in a radio access network) may comprise means for transmitting, to a second terminal device in the radio access network, control information associated with a sidelink (SL) positioning reference signal (PRS) during a SL positioning session for positioning of the second terminal device, using a resource for the control information associated with the SL PRS in a Physical Sidelink Feedback Channel (PSFCH) symbol or in at least one symbol dedicated for the control information associated with the SL PRS.

In some embodiments, the control information associated with the SL PRS indicates at least one of: a resource for the SL PRS, the resource for the SL PRS being comprised in at least one of: at least one Demodulation Reference Signal (DMRS) symbol or at least one symbol dedicated for the SL PRS, an identifier of a resource pool comprising the resource for the SL PRS, and an offset indicating the number of slots after which the SL PRS is to be transmitted.

In some embodiments, the apparatus further comprises: means for receiving, from a network device in the radio access network, configuration information associated with SL positioning sessions for positioning of at least one terminal device in the radio access network; and determine the resource for the control information associated with the SL PRS and the resource for the SL PRS based on the configuration information.

In some embodiments, the apparatus further comprises: means for transmitting, to the second terminal device, the control information associated with the SL PRS, using the resource for the control information associated with the SL PRS in at least one Physical Sidelink Control Channel (PSCCH) symbol.

In some embodiments, the apparatus is an anchor terminal device, the apparatus further comprises means for determining the resource for the SL PRS based on at least one of: a number of terminal devices in the radio access network in SL positioning sessions, criticality of the SL positioning session indicated in a positioning quality of service (QOS), and resource availability at the anchor terminal device.

In some embodiments, the resource for the control information associated with the SL PRS and the resource the SL PRS are comprised in a resource pool. In some embodiments, the resource for the control information associated with the SL PRS and the resource for the SL PRS are comprised in different resource pools. In some embodiments, the control information associated with the SL PRS is comprised in a sidelink control information (SCI).

In some embodiments, the configuration information indicates at least one of: a plurality of slots for SL positioning sessions, whether the resource for control information associated with the SL PRS is in at least one PSFCH symbol, at least one PSCCH symbol, and at least one symbol dedicated for the control information associated with the SL PRS, whether the resource for the control information associated with the SL PRS and the resource for the SL PRS are in different resource pools, and whether the resource for SL PRS is in at least one DRMS symbol or the at least one symbol dedicated for the SL PRS. In some embodiments, the configuration information is comprised in a broadcast downlink (DL) radio resource control (RRC) system information block (SIB) message.

In some embodiments, the apparatus further comprises means for performing other steps in some embodiments of the method 1400. In some embodiments, the means comprises at least one processor; and at least one memory including computer program code, the at least one memory and computer program code configured to, with the at least one processor, cause the performance of the apparatus.

In some embodiments, an apparatus capable of performing the method 1500 (for example, the second terminal device 103) may comprise means for performing the respective steps of the method 1500. The means may be implemented in any suitable form. For example, the means may be implemented in a circuitry or software module.

In some embodiments, an apparatus capable of performing the method 1500 (for example, the second terminal device 103 in a radio access network) may comprise means for receiving, at a second terminal device in a radio access network, from a first terminal device in the radio access network, control information associated with a sidelink (SL) positioning reference signal (PRS) during a SL positioning session for positioning of the second terminal device, using the resource for the control information associated with the SL PRS in a Physical Sidelink Feedback Channel (PSFCH) symbol or in at least one symbols dedicated for the control information associated with the SL PRS.

In some embodiments, the control information associated with the SL PRS indicates at least one of: a resource for the SL PRS, the resource for the SL PRS being comprised in at least one of: at least one Demodulation Reference Signal (DMRS) symbol or at least one symbol dedicated for the SL PRS, an identifier of a resource pool comprising the resource for the SL PRS, and an offset indicating the number of slots after which the SL PRS is to be transmitted.

In some embodiments, the apparatus further comprises means for receiving, from a network device in a radio access network, configuration information associated with SL positioning sessions for positioning of at least one terminal device in the radio access network. In some embodiments, the apparatus further comprises means for receiving, from the first terminal device, the control information associated with the SL PRS using the resource for the control information associated with the SL PRS in at least one Physical Sidelink Control Channel (PSCCH) symbol.

In some embodiments, the resource for the control information associated with the SL PRS and the resource for the SL PRS are comprised in a resource pool. In some embodiments, the resource for the control information associated with the SL PRS and the resource for the SL PRS are comprised in different resource pools. In some embodiments, the control information associated with the SL PRS is comprised in a sidelink control information (SCI).

In some embodiments, the configuration information associated with SL PRS indicates at least one of: a plurality of slots associated with SL positioning sessions, whether the resource for control information associated with the SL PRS is in at least one PSFCH symbol, at least one PSCCH symbol, and at least one symbol dedicated for the control information, and whether the resource for the control information associated with the SL PRS and the resource for the SL PRS are in different resource pools. In some embodiments, the configuration information is comprised in a broadcast downlink (DL) radio resource control (RRC) system information block (SIB) message.

In some embodiments, the apparatus further comprises means for performing other steps in some embodiments of the method 1500. In some embodiments, the means comprises at least one processor; and at least one memory including computer program code, the at least one memory and computer program code configured to, with the at least one processor, cause the performance of the apparatus.

In some embodiments, an apparatus capable of performing the method 1600 (for example, the network device 101) may comprise means for performing the respective steps of the method 1600. The means may be implemented in any suitable form. For example, the means may be implemented in a circuitry or software module.

In some embodiments, an apparatus capable of performing the method 1600 (for example, the network device 101) may comprise means for performing the respective steps of the method 1600. The means may be implemented in any suitable form. For example, the means may be implemented in a circuitry or software module.

In some embodiments, an apparatus capable of performing the method 1600 (for example, the network device 101 in a radio access network) may comprise means for transmitting to at least one terminal device in the radio access network, configuration information associated with sidelink (SL) positioning sessions for positioning of at least one terminal device in the radio access network.

In some embodiments, the configuration information indicates at least one of: a plurality of slots for SL positioning sessions, whether resource for control information is in at least one of: a Physical Sidelink Feedback Channel (PSFCH) symbol, at least one Physical Sidelink Control Channel (PSCCH) symbol, and at least one symbol dedicated for the control information, wherein the control information is associated with a SL positioning reference signal (SL PRS) during sidelink positioning sessions for positioning of the at least one terminal, whether the resource for the control information associated with the SL PRS and a resource for the SL PRS are in different resource pools, and whether the resource for the SL PRS is in at least one Demodulation Reference Signal (DMRS) symbol or at least one symbol dedicated for the SL PRS.

In some embodiments, the configuration information is comprised in a broadcast downlink (DL) radio resource control (RRC) system information block (SIB) message.

In some embodiments, the apparatus further comprises means for performing other steps in some embodiments of the method 1600. In some embodiments, the means comprises at least one processor; and at least one memory including computer program code, the at least one memory and computer program code configured to, with the at least one processor, cause the performance of the apparatus.

Figure 17:
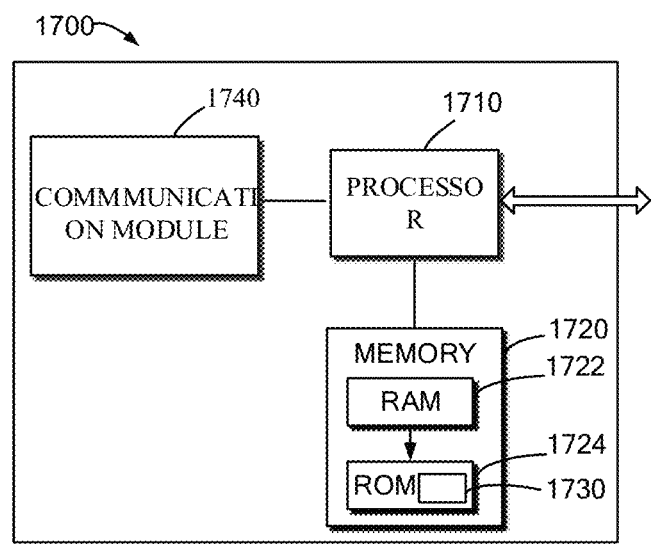
FIG. 17 illustrates a simplified block diagram of a device that is suitable for implementing some example embodiments of the present disclosure.

FIG. 17 illustrates a simplified block diagram of a device 1700 that is suitable for implementing some example embodiments of the present disclosure. The device 1700 may be provided to implement a communication device, for example, the network device 101, the first terminal device 102, or the second terminal device 103 as shown in FIG. 1 or FIG. 2. As shown, the device 1700 includes one or more processors 1710, one or more memories 1720 coupled to the processor 1710, and one or more communication modules 1740 coupled to the processor 1710.

The communication module 1740 is for bidirectional communications. The communication module 1740 has at least one antenna to facilitate communication. The communication interface may represent any interface that is necessary for communication with other network elements.

The processor 1710 may be of any type suitable to the local technical network and may include one or more of the following: general purpose computers, special purpose computers, microprocessors, digital signal processors (DSPs) and processors based on multicore processor architecture, as non-limiting examples. The device 1700 may have multiple processors, such as an application specific integrated circuit chip that is slaved in time to a clock which synchronizes the main processor.

The memory 1720 may include one or more non-volatile memories and one or more volatile memories. Examples of the non-volatile memories include, but are not limited to, a Read Only Memory (ROM) 1724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1722 and other volatile memories that will not last in the power-down duration.

A computer program 1730 includes computer executable instructions that are executed by the associated processor 1710. The program 830 may be stored in the ROM 1724. The processor 1710 may perform any suitable actions and processing by loading the program 1730 into the RAM 1722.

The embodiments of the present disclosure may be implemented by means of the program 1730 so that the device 1700 may perform any process of the disclosure as discussed with reference to FIGS. 2 to 16. The embodiments of the present disclosure may also be implemented by hardware or by a combination of software and hardware.

In some example embodiments, the program 1730 may be tangibly contained in a computer readable medium which may be included in the device 1700 (such as in the memory 1720) or other storage devices that are accessible by the device 1700. The device 1700 may load the program 1730 from the computer readable medium to the RAM 1722 for execution. The computer readable medium may include any types of tangible non-volatile storage, such as ROM, EPROM, a flash memory, a hard disk, CD, DVD, and the like.

Figure 18:
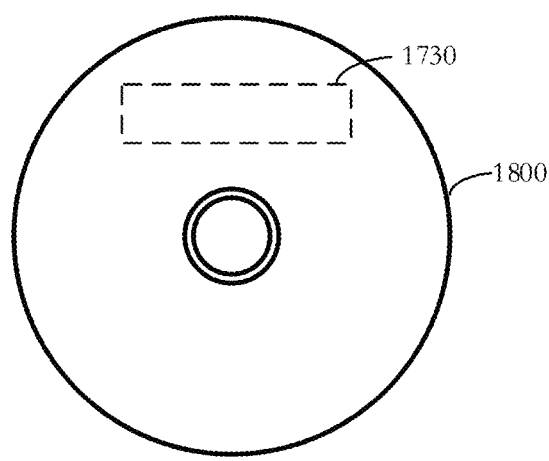
FIG. 18 illustrates a block diagram of an example of a computer readable medium in accordance with some example embodiments of the present disclosure.

FIG. 18 illustrates a block diagram of an example of a computer readable medium 1800 in accordance with some example embodiments of the present disclosure. The computer readable medium 1800 has the program 1730 stored thereon. It is noted that although the computer readable medium 1800 is depicted in form of CD or DVD in FIG. 17, the computer readable medium 1800 may be in any other form suitable for carry or hold the program 1730.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 1400, 1500, or 1600 as described above with reference to FIG. 14, 15, or 16. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first terminal device in a radio access network, comprising:
   at least one processor; and
   at least one memory including computer program code;
   the at least one memory and the computer program code configured to, with the at least one processor, cause the first terminal device to:
   transmit, to a second terminal device in the radio access network, control information associated with a sidelink (SL) positioning reference signal (PRS) during a SL positioning session for positioning of the second terminal device, using a resource for the control information associated with the SL PRS in at least one symbol dedicated for the control information associated with the SL PRS;
   wherein the control information associated with the SL PRS indicates at least one of:
   a resource for the SL PRS, the resource for the SL PRS being comprised in
   at least one symbol dedicated for the SL PRS, and
   an offset indicating the number of slots after which the SL PRS is to be transmitted.

2. The first terminal device of claim 1, wherein the first terminal device is further caused to:
   receive, from a network device in the radio access network, configuration information associated with SL positioning sessions for positioning of at least one terminal device in the radio access network; and
   determine the resource for the control information associated with the SL PRS and the resource for the SL PRS based on the configuration information.

3. The first terminal device of claim 2, wherein the configuration information indicates at least one of:
   a plurality of slots for SL positioning sessions,
   whether the resource for control information associated with the SL PRS is in at least one PSFCH symbol, at least one PSCCH symbol, and at least one symbol dedicated for the control information, whether the resource for the control information associated with the SL PRS and the resource for the SL PRS are in different resource pools, and whether the resource for SL PRS is in at least one DRMS symbol or the at least one symbol dedicated for the SL PRS.

4. The first terminal device of claim 3, wherein the configuration information is comprised in a broadcast downlink (DL) radio resource control (RRC) system information block (SIB) message.

5. The first terminal device of claim 1, wherein the first terminal device is further caused to:

transmit, to the second terminal device, the control information associated with the SL PRS, using the resource for the control information associated with the SL PRS in at least one Physical Sidelink Control Channel (PSCCH) symbol.

6. The first terminal device of claim 1, wherein the first terminal device is an anchor terminal device, the first terminal device is further caused to determine the resource for the SL PRS based on at least one of:

a number of terminal devices in the radio access network in SL positioning sessions, criticality of the SL positioning session indicated in a positioning quality of service (QoS), and resource availability at the anchor terminal device.

7. The first terminal device of claim 1, wherein:

the resource for the control information associated with the SL PRS and the resource for the SL PRS are comprised in a resource pool.

8. The first terminal device of claim 1, wherein the control information associated with the SL PRS is comprised in a sidelink control information (SCI).

9. A second terminal device in a radio access network, comprising:

at least one processor; and at least one memory including computer program code;

the at least one memory and the computer program code configured to, with the at least one processor, cause the second terminal device to:

receive, from a first terminal device in the radio access network, control information associated with a sidelink (SL) positioning reference signal (PRS) during a SL positioning session for positioning of the second terminal device, using the resource for the control information associated with the SL PRS in at least one symbol dedicated for the control information associated with the SL PRS;

wherein the control information associated with the SL PRS indicates at least one of:

a resource for the SL PRS, the resource for the SL PRS being comprised in at least one symbol dedicated for the SL PRS, and an offset indicating the number of slots after which the SL PRS is to be transmitted.

10. The second terminal device of claim 9, wherein the second terminal device is further caused to:

receive, from a network device in a radio access network, configuration information associated with SL positioning sessions for positioning of at least one terminal device in the radio access network.

11. The second terminal device of claim 10, wherein the configuration information associated with SL PRS indicates at least one of:

a plurality of slots associated with SL positioning sessions, whether the resource for control information associated with the SL PRS is in at least one PSFCH symbol, at least one PSCCH symbol, and at least one symbol dedicated for the control information associated with the SL PRS, and whether the resource for the control information associated with the SL PRS and the resource for the SL PRS are in different resource pools.

12. The second terminal device of claim 11, wherein the configuration information is comprised in a broadcast downlink (DL) radio resource control (RRC) system information block (SIB) message.

13. The second terminal device of claim 9, wherein the second terminal device is further caused to:

receive, from the first terminal device, the control information using the resource for the control information associated with the SL PRS in at least one Physical Sidelink Control Channel (PSCCH) symbol.

14. The second terminal device of claim 9, wherein:

the resource for the control information associated with the SL PRS and the resource for the SL PRS are comprised in a resource pool.

15. The second terminal device of claim 9, wherein the control information associated with the SL PRS is comprised in a sidelink control information (SCI).

* * * * *